United States Patent
Ma

(10) Patent No.: US 12,454,658 B2
(45) Date of Patent: Oct. 28, 2025

(54) METHOD OF PREPARING A RANDOMLY INTERESTERIFIED FAT PRODUCT

(71) Applicant: Bunge Loders Croklaan B.V., Wormerveer (NL)

(72) Inventor: Jun Ma, Wormerveer (NL)

(73) Assignee: BUNGE LODERS CROKLAAN B.V., Wormerveer (NL)

( * ) Notice: Subject to any disclaimer, the term of this patent is extended or adjusted under 35 U.S.C. 154(b) by 636 days.

(21) Appl. No.: 17/790,980

(22) PCT Filed: Jan. 6, 2021

(86) PCT No.: PCT/EP2021/050106
§ 371 (c)(1),
(2) Date: Jul. 6, 2022

(87) PCT Pub. No.: WO2021/140109
PCT Pub. Date: Jul. 15, 2021

(65) Prior Publication Data
US 2023/0023437 A1 Jan. 26, 2023

(30) Foreign Application Priority Data
Jan. 7, 2020 (EP) .................................... 20150614

(51) Int. Cl.
*C11C 3/10* (2006.01)
*A23D 9/013* (2006.01)
*A23D 9/04* (2006.01)

(52) U.S. Cl.
CPC ............... *C11C 3/10* (2013.01); *A23D 9/013* (2013.01); *A23D 9/04* (2013.01)

(58) Field of Classification Search
CPC .............. C11C 3/10; A23D 9/013; A23D 9/04
See application file for complete search history.

(56) References Cited

U.S. PATENT DOCUMENTS 4,275,011 A 6/1981 Tanaka et al.

FOREIGN PATENT DOCUMENTS

| EP | 0257388 A2 | 2/1988 |
|---|---|---|
| EP | 0516542 A1 | 12/1992 |

(Continued)

OTHER PUBLICATIONS

International Search Report issued in corresponding International Patent Application No. PCT/EP2021/050106 dated Mar. 26, 2021.

(Continued)

*Primary Examiner* — Erik Kashnikow
*Assistant Examiner* — Assaf Zilbering
(74) *Attorney, Agent, or Firm* — Morgan, Lewis & Bockius LLP

(57) ABSTRACT

A method of preparing an edible randomly interesterified fat product comprises the steps of: a) providing a fat composition comprising from 0.5% to 25% by weight of free fatty acids; and b) reacting enzymatically the fat composition provided in step a) with from 0.5% to 10% by weight of a polyol compound based on the fat composition, wherein the weight ratio of free fatty acid in the fat composition to the polyol composition is from 0.1 to 20.0; and wherein the obtained randomly interesterified fat product has less than 1.0% by weight of free fatty acids.

15 Claims, 1 Drawing Sheet

(56) References Cited

FOREIGN PATENT DOCUMENTS

| | | |
|---|---|---|
| EP | 0739590 A2 | 10/1996 |
| RU | 2162642 C2 | 2/2001 |
| WO | 96/37587 A1 | 11/1996 |
| WO | 97/40698 A1 | 11/1997 |
| WO | 2005010136 A2 | 2/2005 |
| WO | 2006124818 A2 | 11/2006 |
| WO | 2013131862 A1 | 9/2013 |
| WO | WO-2016101894 A1 * | 6/2016 ............... A23D 9/04 |
| WO | 2017133895 A1 | 8/2017 |
| WO | 2019/020714 A1 | 1/2019 |
| WO | 2021140109 A1 | 7/2021 |

OTHER PUBLICATIONS

Written Opinion issued in corresponding International Patent Application No. PCT/EP2021/050106 dated Mar. 26, 2021.
Zhao et al., "Study on the degree of random transesterification reaction of oils and fats analyzed by high temperature gas chromatography", 2015, 10 pages total.
Yan et al., "Lipase non-aqueous catalysis", 2008, 5 pages total.
"Development of Modern New Protein and Fatty Foods", 2003, 2 pages total.
"Food Enzymology", 1992, 3 pages total.
Japanese Agricultural Standards for Edible Vegetable Oils (as of Jul. 2015) [online], Nov. 28, 2024-Retrieved from <http://www.oil-kensa.or.jp/pdf/JAS-kikakuti.pdf> (see JPOA).
Office Action issued in Japanese Patent Application No. 2022-541859 dated Dec. 9, 2024.

* cited by examiner

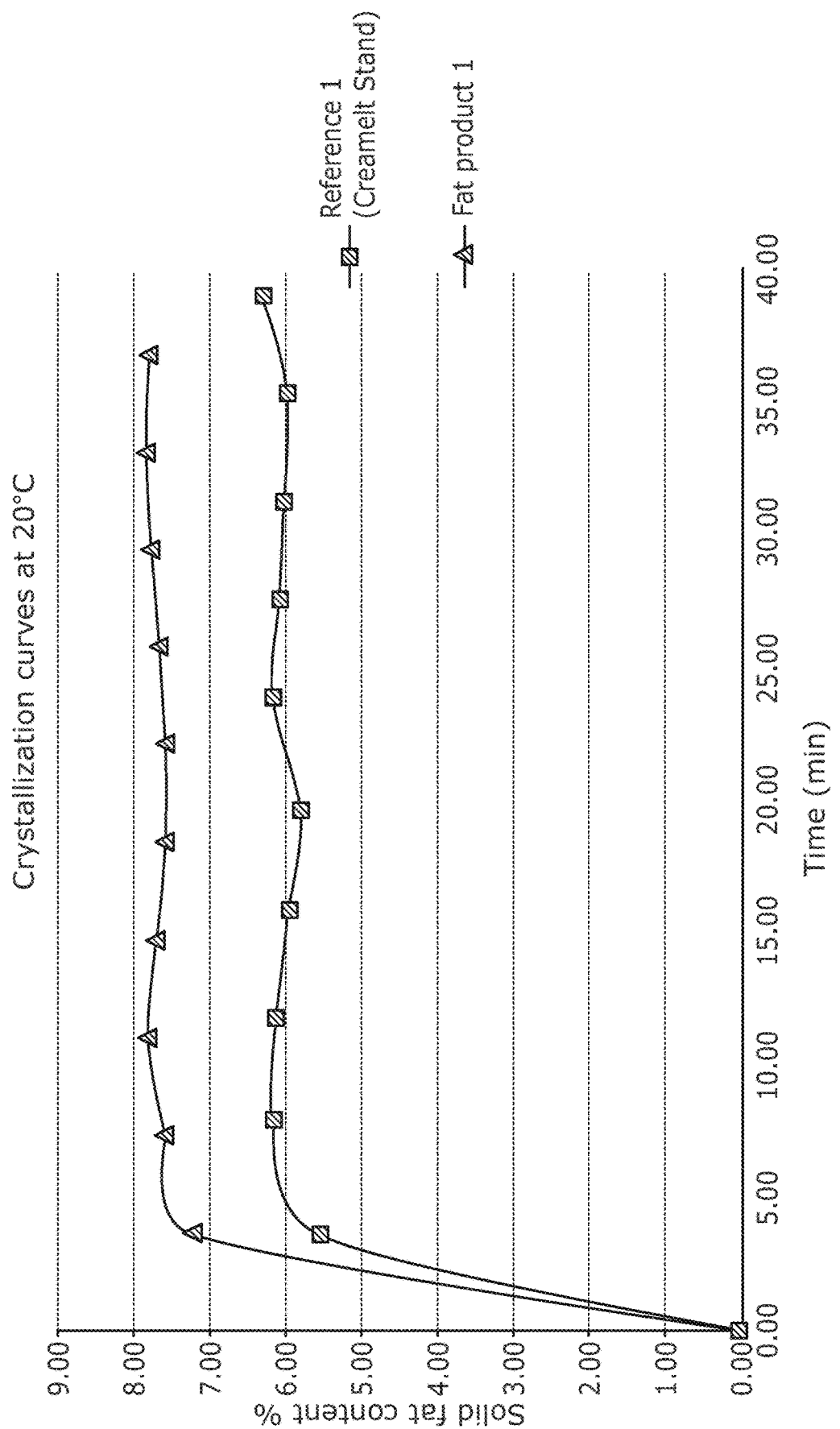

METHOD OF PREPARING A RANDOMLY INTERESTERIFIED FAT PRODUCT

This invention relates to a method of preparing a randomly interesterified fat product and the use thereof.

BACKGROUND

Fats and oils are important ingredients of food products such as confectionery products, bakery products or culinary products.

Interesterification is performed in order to effect complete randomization of the fatty acid acyl groups so that the physical properties of the fat or oil can be altered to fulfill the requirements of various applications. Chemical interesterification requires often an alkaline catalyst, such as sodium methanolate. However, in the presence of a high amount of free fatty acids, the interesterification cannot be performed or not completely performed.

Therefore, an extra deacidification step such as distillation or neutralization is necessary prior to interesterification.

The interesterification reaction can also be catalyzed by an enzyme. The presence of a high amount of free fatty acids may not affect the reaction catalyzed by enzyme. However, after interesterification before refining, these need to be removed by an extra deacidification such as distillation or neutralization.

WO 2005/010136 A2 relates to a method that can greatly improve the productivity of enzymatic transesterification or esterification by deodorization alone, or by deodorization and purification of the initial substrate to extend the useful life of the enzyme.

WO 2006/124818 A2 discloses a method that can greatly improve the productivity of enzymatic esterification, transesterification or interesterification by purifying the substrate oil to extend the useful life of the enzyme.

WO 2013/131862 A1 relates to a glyceride composition obtainable from shea oil comprising at least 75% by weight triglycerides and from 5 to 25% by weight diglycerides based on the total weight of the composition, and having an oleic acid content of at least 65% by weight and a combined stearic acid plus palmitic acid content of from 10 to 20% by weight based on the total C12 to C20 fatty acids present in the glycerides, the oleic acid, stearic acid and palmitic acid being present as acyl groups in mono-, di- or tri-glycerides.

WO 2019/020714 A1 discloses a non-hydrogenated fat composition that comprises greater than 28% by weight stearic acid (C18:0) fatty acid residues; greater than 44% by weight oleic acid (C18:1) fatty acid residues, and less than 10% by weight of palmitic acid (C16) fatty acid residues, based on the total C8-C24 fatty acid residues, and greater than 30% by weight of the combined amounts of StOSt, StStO, StOO and OStO triglycerides based on the total glycerides present in the composition, wherein the weight ratio of (StOSt+StStO)/(StOO+OStO) is from 0.6-1.5.

WO 2017/133895 A1 relates to a method of preparing a self-emulsifying fat composition. EP A1 0 516 542 is concerned with a combined fractionation, refining and interesterification process, wherein the crucial step is the fractionation of a fat fraction, containing free fatty acids at a temperature between −5 and −30 DEG C.

EP A2 0 257 388 discloses fats transesterified with an enzymatic preparation containing a lipase having the thermostability at a sufficiently high temperature to melt a reactive substrate, without use of a solvent, water being removed out of the reaction system during the reaction.

There remains a need to improve the efficiency of processes for random interesterification of fats, particularly when the content of free fatty acid is high in the raw material. There is also a need to improve the quality of the randomly interesterified fat product in different aspects, such as desirable crystallization properties and appearance.

DESCRIPTION OF THE INVENTION

According to the present invention, there is provided a method of preparing an edible randomly interesterified fat product comprising the steps of: a) providing a fat composition comprising from 0.5% to 25% by weight of free fatty acids measured according to AOCS Ca 5a-40 and calculated as percentage oleic acid; and b) reacting enzymatically the fat composition with from 0.5% to 10% by weight of a polyol compound based on the weight of the fat composition, wherein the weight ratio of free fatty acid in the fat composition to the polyol compound is from 0.1 to 20.0; and wherein the obtained randomly interesterified fat product has less than 1.0% by weight of free fatty acids measured according to AOCS Ca 5a-40 and calculated as percentage oleic acid.

The method of the invention has been found particularly useful for randomly interesterifying a fat composition containing a high amount of free fatty acids, such as 0.5% by weight of free fatty acids or more. No removal of free fatty acids is necessary for the interesterification method according to the invention, while the conventional randomization method in contrast requires the removal of free fatty acids, for example prior to interesterification. Accordingly, the efficiency of the method can be significantly improved and the loss during the whole interesterification can be significantly limited since no removal of free fatty acids is needed during the interesterification process. Moreover, since no removal of free fatty acids is needed, less waste of free fatty acid is generated when the method according to the invention is applied.

In addition, it has been surprisingly found that the randomly interesterified fat product made according to the method of the invention has particularly good crystallization behavior and desirable appearance, in particular of light color. These improved properties make the randomly interesterified fat product made according to the method particularly suitable for various applications, such as confectionery, bakery or culinary, compared to a similar fat product made by conventional process.

The term "fat" refers to glyceride fats and oils containing fatty acid acyl groups and does not imply any particular melting point. The term "oil" is used synonymously with "fat". The term "free fatty acid" refers to fatty acid not bound to any alcohol (such as glycerol) as part of an ester molecule. Free fatty acid content may be determined by titration with a standard alkali according to ACOS Official Method Ca 5a-40. Free fatty acid concentration is calculated and expressed, for example as percentage oleic acid. The molar mass of oleicacid (282 g/mol) is therefore used in the expression as given in AOS Official Method Ca 5a-40 to calculate the free fatty acid percentage. In the AOCS Ca 5a-40 method the calculation below assumes that the molar number of titrated acid groups correspond to oleic acid:

% FFA as oleic acid=(titrated mol base×282 g/mol)/sample weight (g)×100%

The resulting FFA value by weight is an approximation, as in naturally occurring oils and fats, the actual free fatty acids are a mixture of different fatty acids having different molecular weights.

The term "random interesterification" refers to a random non-specific redistribution of the fatty acid moieties present in a triglyceride oil over its glycerol moieties.

The term "polyol composition" refers to a composition consisting of one or more organic compounds containing two or more hydroxyl groups, such as glycerol, propylene glycol, polyglycerol, sugar alcohols, polyethylene glycol, polypropylene glycol etc.

The term "fatty acid" refers to straight chain saturated or unsaturated (including mono- and poly unsaturated) carboxylic acids having from 8 to 24 carbon atoms. A fatty acid having x carbon atoms and y double bonds may be denoted Cx:y. For example, palmitic acid may be denoted C16:0 and oleic acid may be denoted C18:1. The fatty acid profile may be determined by fatty acid methyl ester analysis (FAME) using gas chromatography according to ISO 12966-2 and ISO 12966-4. Thus, percentages of fatty acids in compositions (e.g. palmitic acid (C16:0), stearic acid (C18:0), oleic acid (C18:1) etc.) referred to herein include both acyl groups such as tri-, di- and mono-glycerides and free fatty acids (but exclude any unsaponifiable matter) and are based on the total weight of C8 to C24 fatty acid residues.

According to the invention, the weight ratio of free fatty acid in the provided fat composition in step a) to the polyol composition n step b) is preferably from 0.2 to 18.0, more preferably from 0.3 to 15.0, even more preferably from 0.5 to 15.0 and most preferably from 0.5 to 10.0. The method according to the invention is particularly efficient with a further improved yield when the preferred weight ratio is used.

In step a) of the method according to the invention, the provided fat composition preferably comprises from 0.5% to 20% by weight of free fatty acids measured according to AOCS Ca 5a-40 and calculated as percentage oleic acid, more preferably from 0.5% to 18% by weight, even more preferably from 0.8% to 17% by weight and most preferably from 1.0% to 15% by weight, In step a) of the method according to the invention, the provided fat composition is preferably selected from shea butter, cocoa butter, sal butter, mango kernel oil, illipe butter, kokum butter, mowrah butter, high stearic high oleic sunflower oil, fractions thereof and mixtures thereof. More preferably, the provided fat composition is selected from shea butter, shea olein, shea stearin, cocoa butter and mixtures thereof. Even more preferably, the provided fat composition is a single fat composition such as shea butter, shea olein or cocoa butter. Alternatively, the provided fat composition is more preferably a blend of shea butter and shea olein, where the weight ratio of shea butter to shea olein is from 20:80 to 80:20 or a blend of shea olein and shea stearin, where the weight ratio of shea butter to shea stearin is from 20:80 to 80:20.

In step a) of the method according to the invention, the provided fat composition preferably comprises at least 15% by weight of stearic acid (C18:0); said percentage of acid referring to acids bound as acyl groups in glycerides and any free fatty acids present in the fat composition and being based on the total weight of C8 to C24 fatty acids. The provided fat composition more preferably comprises from 20% to 80% by weight of stearic acid (C18:0), even more preferably from 25% to 75% by weight and most preferably from 25% to 70%. Accordingly, in a preferred embodiment, in step a) of the method according to the invention, the provided fat composition comprises 0.5% to 20% by weight of free fatty acids measured according to AOCS Ca 5a-40 and calculated as percentage oleic acid and at least 15% by weight of stearic acid (C18:0); said percentage of acid referring to acids bound as acyl groups in glycerides and any free fatty acids present in the fat composition and being based on the total weight of C8 to C24 fatty acids.

In a more preferred embodiment, in step a) of the method according to the invention, the provided fat composition comprises 0.5% to 18% by weight of free fatty acids measured according to AQOCS Ca 5a-40 and calculated as percentage oleic acid and from 20% to 80% by weight of stearic acid (C18:0); said percentage of acid referring to acids bound as acyl groups in glycerides and any free fatty acids present in the fat composition and being based on the total weight of C8 to C24 fatty acids.

In an even more preferred embodiment, in step a) of the method according to the invention, the provided fat composition comprises 0.8% to 17% by weight of free fatty acids measured according to AOCS Ca 5a-40 and calculated as percentage oleic acid and from 25% to 75% by weight of stearic acid (C18:0); said percentage of acid referring to acids bound as acyl groups in glycerides and any free fatty acids present in the fat composition and being based on the total weight of C8 to C24 fatty acids.

In a most preferred embodiment, in step a) of the method according to the invention, the provided fat composition comprises 1.0% to 16% by weight of free fatty acids measured according to AOCS Ca 5a-40 and calculated as percentage oleic acid and from 25% to 70% by weight of stearic acid (C18:0); said percentage of acid referring to acids bound as acyl groups in glycerides and any free fatty acids present in the fat composition and being based on the total weight of C8 to C24 fatty acids.

The term "unsaponifiables" refers to the substances present in oils or fats that are not saponified by alkali hydroxides and are extractable into ether. Unsaponifiables content may be measured according to AOCS Ca 6a-40.

In step a) of the method according to the invention, the provided fat composition preferably comprises at least 1% by weight of unsaponifiables, more preferably at least 2% by weight, further more preferably from 3% to 15% by weight, even more preferably from 4% to 12% by weight and most preferably from 5% to 10% by weight. It is believed that the method according to the invention is particularly suitable for fat compositions comprising the indicated amount of unsaponifiables.

Accordingly, in a preferred embodiment, in step a) of the method according to the invention, the provided fat composition comprises: 0.5% to 20% by weight of free fatty acids measured according to AOCS Ca 5a-40 and calculated as percentage oleic acid; and at least 15% by weight of stearic acid (C18:0); said percentages of acid referring to acids bound as acyl groups in glycerides and any free fatty acids present in the fat composition and being based on the total weight of C8 to C24 fatty acids; and at least 2% by weight of unsaponifiables.

In a more preferred embodiment, in step a) of the method according to the invention, the provided fat composition comprises: 0.5% to 18% by weight of free fatty acids measured according to AOCS Ca 5a-40 and calculated as percentage oleic acid; and from 20% to 80% by weight of stearic acid (C18:0); said percentage of acid referring to acids bound as acyl groups in glycerides and any free fatty acids present in the fat composition and being based on the total weight of C8 to C24 fatty acids; and from 3% to 15% by weight of unsaponifiables.

In an even more preferred embodiment, in step a) of the method according to the invention, the provided fat composition comprises: 0.8% to 17% by weight of free fatty acids measured according to AOCS Ca 5a-40 and calculated as percentage oleic acid; from 25% to 75% by weight of stearic acid (C18:0); said percentage of acid referring to acids bound as acyl groups in glycerides and any free fatty acids present in the fat composition and being based on the total weight of C8 to C24 fatty acids; and from 4% to 12% by weight of unsaponifiables.

In a most preferred embodiment, in step a) of the method according to the invention, the provided fat composition comprises 1.0% to 16% by weight of free fatty acids measured according to AOCS Ca 5a-40 and calculated as percentage oleic acid; from 25% to 70% by weight of stearic acid (C18:0); said percentage of acid referring to acids bound as acyl groups in glycerides and any free fatty acids present in the fat composition and being based on the total weight of C8 to C24 fatty acids; and from 5% to 10% by weight of unsaponifiables.

According to the invention, in step b) of the method, the provided fat composition is preferably reacted with from 0.5% to 8% by weight of the polyol composition based on the weight of the provided fat composition, more preferably from 0.5% to 6% by weight, even more preferably from 1% to 5% by weight and most preferably from 1% to 3% by weight. In a preferred embodiment, the method of preparing an edible randomly interesterified fat product according to the invention comprises the steps of: a) providing a fat composition comprising from 0.5% to 20% by weight of free fatty acids measured according to AOCS Ca 5a-40 and calculated as percentage oleic acid; and b) reacting enzymatically the provided fat composition with from 0.5% to 8% by weight of a polyol composition based on the weight of the provided fat composition, wherein the weight ratio of free fatty acid in the provided fat composition to the polyol compound is from 0.2 to 18.0; and wherein the obtained randomly interesterified fat product has less than 1.0% by weight of free fatty acids measured according to AOCS Ca 5a-40 and calculated as percentage oleic acid.

In a more preferred embodiment, the method of preparing an edible randomly interesterified fat product according to the invention comprises the steps of: a) providing a fat composition comprising from 0.5% to 18% by weight of free fatty acids measured according to AOCS Ca 5a-40 and calculated as percentage oleic acid; and b) reacting enzymatically the provided fat composition with from 0.5% to 6% by weight of a polyol composition based on the weight of the provided fat composition, wherein the weight ratio of free fatty acid in the provided fat composition to the polyol compound is from 0.3 to 15.0; and wherein the obtained randomly interesterified fat product has less than 1.0% by weight of free fatty acids measured according to AOCS Ca 5a-40 and calculated as percentage oleic acid.

In an even more preferred embodiment, the method of preparing an edible randomly interesterified fat product according to the invention comprises the steps of: a) providing a fat composition comprising from 0.8% to 17% by weight of free fatty acids measured according to AOCS Ca 5a-40 and calculated as percentage oleic acid; and b) reacting enzymatically the provided fat composition with from 1% to 5% by weight of a polyol composition based on the weight of the provided fat composition, wherein the weight ratio of free fatty acid in the provided fat composition to the polyol compound is from 0.5 to 15.0; and wherein the obtained randomly interesterified fat product has less than 1.0% by weight of free fatty acids measured according to AOS Ca 5a-40 and calculated as percentage oleic acid.

In a most preferred embodiment, the method of preparing an edible randomly interesterified fat product according to the invention comprises the steps of: a) providing a fat composition comprising from 1.0% to 16% by weight of free fatty acids measured according to AOCS Ca 5a-40 and calculated as percentage oleic acid; and b) reacting enzymatically the provided fat composition with from 1% to 3% by weight of a polyol composition based on the weight of the provided fat composition, wherein the weight ratio of free fatty acid in the provided fat composition to the polyol compound is from 0.5 to 10.0; and wherein the obtained randomly interesterified fat product has less than 1.0% by weight of free fatty acids measured according to AOCS Ca 5a-40 and calculated as percentage oleic acid.

In step b) of the method according to the invention, the polyol composition is preferably selected from glycerol, propylene glycol, polyglycerol, sugar alcohols, polyethylene glycol, polypropylene glycol and mixtures thereof, more preferably selected from glycerol, propylene glycol, polyglycerol and mixtures thereof, even more preferably selected from glycerol, propylene glycol and mixtures thereof. Most preferably, in step b) of the method according to the invention, the polyol composition consists of glycerol. Alternatively, in step b) of the method according to the invention, the polyol composition is preferably a mixture of glycerol and propylene glycol, wherein the weight ratio of glycerol to propylene glycol is from 1:3 to 3:1.

In step b) of the method according to the invention, the reaction is preferably catalyzed by a lipase, more preferably an immobilized lipase and even more preferably an immobilized lipase. Preferably, the lipase is from *Rhizomucor miehei, Candida antarctica, Thermomyces lanuginosus* or *Rhizopus oryzae*. For example, Novozym® 40086 is a commercial immobilized lipase from *Rhizomucor miehei* immobilized on microporous anionic resin. Novozym® 435 is a commercial immobilized lipase from *Candida antarctica* immobilized on microporous acrylic resin. Lipozyme® TL IM is a commercial immobilized lipase from *Thermomyces lanuginosus* immobilized on a non-compressible silica gel carrier. These enzymes have been found particularly stable in terms of their reuse for the method according to the invention.

In step b) of the method according to the invention, the reaction is preferably carried out at a range of temperature from 20° C. to 85° C., more preferably from 30° C. to 80° C., even more preferably from 40° C. to 80'C and most preferably from 50° C. to 75° C. Further, the reaction is preferably carried out in a drying environment, such as by bubbling (mixing) with nitrogen gas or under vacuum. The reaction time is preferably from 1 hour to 48 hours, more preferably from 3 hours to 36 hours and even more preferably from 7 hours to 30 hours.

After step b) of the method according to the invention, the obtained randomly interesterified fat product is preferably subjected to refining, more preferably physical refining including bleaching and deodorization. Physical refining is well known in the art; it reduces the free fatty acids mainly during the deodorization step and does not involve alkali neutralization. It is believed that the combination of physical refining with the method according to the invention would further improve the yield and efficiency of the whole process to produce a randomly interesterified fat product.

Accordingly, in a preferred embodiment, the method of preparing an edible randomly interesterified fat product according to the invention comprises the steps of: a) providing a fat composition comprising from 0.5% to 20% by weight of free fatty acids measured according to AOCS Ca 5a-40 and calculated as percentage oleic acid; and b) reacting enzymatically, by using an immoblized lipase where the lipase is from *Rhizomucor miehi, Candida antarctica, Ther-*

*momyces lanuginosus* or *Rhizopus oryzae*, the provided fat composition with from 0.5% to 8% by weight of a polyol composition based on the weight of the provided fat composition, wherein the polyol composition is selected from glycerol, propylene glycol, polyglycerol and mixtures thereof and the weight ratio of free fatty acid in the provided fat composition to the polyol composition is from 02 to 18.0; and wherein the obtained randomly interesterified fat product has less than 1.0% by weight of free fatty acids measured according to AOCS Ca 5a-40 and calculated as percentage oleic acid.

In a more preferred embodiment, the method of preparing an edible randomly interesterified fat product according to the invention comprises the steps of: a) providing a fat composition comprising from 0.5% to 18% by weight of free fatty acids measured according to AOS Ca 5a-40 and calculated as percentage oleic acid; and b) reacting enzymatically, by using an immobilized lipase where the lipase is from *Rhizomucor miehei, Candida antarctica, Thermomyces lanuginosus* or *Rhizopus oryzae*, the provided fat composition with from 0.5% to 6% by weight of a polyol composition based on the weight of the provided fat composition, wherein the polyol composition is selected from glycerol, propylene glycol, polyglycerol and mixtures thereof and the weight ratio of free fatty acid in the provided fat composition to the polyol composition is from 0.3 to 15.0; and wherein the obtained randomly interesterified fat product has less than 1.0% by weight of free fatty acids measured according to AOCS Ca 5a-40 and calculated as percentage oleic acid.

In an even more preferred embodiment, the method of preparing an edible randomly interesterified fat product according to the invention comprises the steps of: a) providing a fat composition comprising from 08% to 17% by weight of free fatty acids measured according to AOCS Ca 5a-40 and calculated as percentage oleic acid; and b) reacting enzymatically, by using an immobilized lipase where the lipase is from *Rhizomucor miehei, Candida antarctica, Thermomyces lanuginosus* or *Rhizopus oryzae*, the provided fat composition with from 1% to 5% by weight of a polyol composition based on the weight of the provided fat composition, wherein the polyol composition is selected from glycerol, propylene glycol, polyglycerol and mixtures thereof and the weight ratio of free fatty acid in the provided fat composition to the polyol composition is from 0.5 to 15.0; and wherein the obtained randomly interesterified fat product has less than 1.0% by weight of free fatty acids measured according to AOS Ca 5a-40 and calculated as percentage oleic acid.

In a most preferred embodiment, the method of preparing an edible randomly interesterified fat product according to the invention comprises the steps of: a) providing a fat composition comprising from 1.0% to 16% by weight of free fatty acids measured according to AOCS Ca 5a-40 and calculated as percentage oleic acid; and b) reacting enzymatically, by using an immobilized lipase where the lipase is from *Rhizomucor miehei, Candida antarctica, Thermomyces lanuginosus* or *Rhizopus oryzae*, the provided fat composition with from 1% to 3% by weight of a polyol composition based on the weight of the provided fat composition, wherein the polyol composition consists of glycerol and the weight ratio of free fatty acid in the provided fat composition to the glycerol is from 0.5 to 10.0; and wherein the obtained randomly interesterified fat product has less than 1.0% by weight of free fatty acids measured according to AOCS Ca 5a-40 and calculated as percentage oleic acid.

In an additional preferred embodiment, the method of preparing an edible randomly interesterified fat product according to the invention comprises the steps of: a) providing a fat composition comprising from 1.0% to 16% by weight of free fatty acids measured according to AOCS Ca 5a-40 and calculated as percentage oleic acid; b) reacting enzymatically, by using an immobilized lipase where the lipase is from *Rhizomucor miehei, Candida antarctica, Thermomyces lanuginosus* or *Rhizopus oryzae*, the provided fat composition with from 1% to 3% by weight of a polyol composition based on the weight of the provided fat composition, wherein the polyol composition consists of glycerol and the weight ratio of free fatty acid in the provided fat composition to the glycerol is from 0.5 to 10.0; and wherein the obtained randomly interesterified fat product has less than 10% by weight of free fatty acids measured according to AOCS Ca 5a- and calculated as percentage oleic acid; and c) refining the obtained randomly interesterified fat product, preferably by physical refining.

In another preferred embodiment, the method of preparing an edible randomly interesterified fat product according to the invention comprises the steps of: a) providing a fat composition comprising from 1.0% to 16% by weight of free fatty acids measured according to AOCS Ca a-40 and calculated as percentage oleic acid and from 3% to 15% by weight of unsaponifiables; and b) reacting enzymatically, by using an immobilized lipase where the lipase is from *Rhizomucor miehei, Candida antarctica, Thermomyces lanuginosus* or *Rhizopus oryzae*, the provided fat composition with from 1% to 3% by weight of a polyol composition based on the weight of the provided fat composition, wherein the polyol composition consists of glycerol and the weight ratio of free fatty acid in the provided fat composition to the glycerol is from 0.5 to 10.0; and wherein the obtained randomly interesterified fat product has less than 1.0% by weight of free fatty acids measured according to AOCS Ca 5a-40 and calculated as percentage oleic acid. In an alternative preferred embodiment, the method of preparing an edible randomly interesterified fat product according to the invention comprises the steps of: a) providing a fat composition comprising from 1.0% to 16% by weight of free fatty acids measured according to AOCS Ca 5a-40 and calculated as percentage oleic acid; and b) reacting enzymatically, by using an immobilized lipase where the lipase is from *Rhizomucor miehei, Candida antarctica, Thermomyces lanuginosus* or *Rhizopus oryzae*, the provided fat composition with from 1% to 3% by weight of a polyol composition based on the weight of the provided fat composition, wherein the polyol composition is a mixture of glycerol and propylene glycol and the weight ratio of free fatty acid in the provided fat composition to the polyol composition is from 0.5 to 10.0; and wherein the obtained randomly interesterified fat product has less than 1.0% by weight of free fatty acids measured according to AOCS Ca 5a-40 and calculated as percentage oleic acid.

According to the invention, the obtained randomly interesterified fat product of the method preferably has less than 0.80% by weight of free fatty acids measured according to AQOCS Ca 5a-40 and calculated as percentage oleic acid, preferably from 0.01% to 0.50% by weight, more preferably from 0.01% to 0.40% by weight and even more preferably from 0.01% to 0.30% by weight.

The degree of randomization in a randomly interesterified fat may be calculated based on the triglyceride that is decreasing the most during the reaction. "TAGd" refers to the triglyceride content after the reaction where this triglyceride is decreasing the most during the reaction. "TAGi"

refers to the content of that triglyceride before the reaction. The same fat chemically interesterified is considered as completely randomized. "TAGe" refers to the content of that triglyceride via chemical interesterification. Therefore, the degree of randomization may be calculated based on the following formula:

Degree of randomization %=(TAGi−TAGd)/(TAGi−TAGe)×100%

If the degree of randomization is calculated to be above 100%, it could be considered that the degree of randomization is 100% where the randomization is complete. This may due to the tolerated errors of the analytical method.

According to the invention, the obtained randomly interesterified fat product of the method preferably has a degree of randomization of at least 70%, more preferably at least 75%, further more preferably from 80% to 100%, even more preferably from 84% to 100% and most preferably from 90% to 98%.

Accordingly, in a preferred embodiment, the method of preparing an edible randomly interesterified fat product according to the invention comprises the steps of: a) providing a fat composition comprising from 0.5% to 20% by weight of free fatty acids measured according to AOCS Ca 5a-40 and calculated as percentage oleic acid; and b) reacting enzymatically, by using an immobilized lipase where the lipase is from *Rhizomucor miehei, Candida antarctica, Thermomyces lanuginosus* or *Rhizopus oryzae*, the provided fat composition with from 0.5% to 8% by weight of a polyol composition based on the weight of the provided fat composition, wherein the polyol composition is selected from glycerol, propylene glycol, polyglycerol and mixtures thereof and the weight ratio of free fatty acid in the provided fat composition to the polyol composition is from 0.2 to 18.0; and wherein the obtained randomly interesterified fat product has less than 0.80% by weight of free fatty acids measured according to AOCS Ca 5a-40 and calculated as percentage oleic acid and a degree of randomization of at least 75%.

In a more preferred embodiment, the method of preparing an edible randomly interesterified fat product according to the invention comprises the steps of: a) providing a fat composition comprising from 0.5% to 18% by weight of free fatty acids measured according to AOCS Ca 5a-40 and calculated as percentage oleic acid; and b) reacting enzymatically, by using an immobilized lipase where the lipase is from *Rhizomucor miehei, Candida antarctica, Thermomyces lanuginosus* or *Rhizopus oryzae*, the provided fat composition with from 0.5% to 6% by weight of a polyol composition based on the weight of the provided fat composition, wherein the polyol composition is selected from glycerol, propylene glycol, polyglycerol and mixtures thereof and the weight ratio of free fatty acid in the provided fat composition to the polyol compound is from 0.3 to 15.0; and wherein the obtained randomly interesterified fat product has from 0.01% to 0.50% by weight of free fatty acids measured according to AOCS Ca 5a-40 and calculated as percentage oleic acid and a degree of randomization of from 80% to 100%.

In an even more preferred embodiment, the method of preparing an edible randomly interesterified fat product according to the invention comprises the steps of: a) providing a fat composition comprising from 0.8% to 17% by weight of free fatty acids measured according to AOCS Ca 5a-40 and calculated as percentage oleic acid; and b) reacting enzymatically, by using an immobilized lipase where the lipase is from *Rhizomucor miehei, Candida antarctica, Thermomyces lanuginosus* or *Rhizopus oryzae*, the provided fat composition with from 1% to 5% by weight of a polyol composition based on the weight of the provided fat composition, wherein the polyol composition is selected from glycerol, propylene glycol, polyglycerol and mixtures thereof and the weight ratio of free fatty acid in the provided fat composition to the polyol compound is from 0.5 to 15.0; and wherein the obtained randomly interesterified fat product has from 0.01% to 0.40% by weight of free fatty acids measured according to AOCS Ca 5a-40 and calculated as percentage oleic acid and a degree of randomization of from 84% to 100%.

In a most preferred embodiment, the method of preparing an edible randomly interesterified fat product according to the invention comprises the steps of: a) providing a fat composition comprising from 1.0% to 16% by weight of free fatty acids measured according to AOCS Ca 5a-40 and calculated as percentage oleic acid; and b) reacting enzymatically, by using an immobilized lipase where the lipase is from *Rhizomucor miehei, Candida antarctica, Thermomyces lanuginosus* or *Rhizopus oryzae*, the provided fat composition with from 1% to 3% by weight of a polyol composition based on the weight of the provided fat composition, wherein the polyol composition consists of glycerol and the weight ratio of free fatty acid in the provided fat composition to the glycerol is from 0.5 to 10.0; and wherein the obtained randomly interesterified fat product has from 0.01% to 0.30% by weight of free fatty acids measured according to AOCS Ca 5a-40 and calculated as percentage oleic acid and a degree of randomization of from 90% to 98%.

In an additional preferred embodiment, the method of preparing an edible randomly interesterified fat product according to the invention comprises the steps of: a) providing a fat composition comprising from 1.0% to 16% by weight of free fatty acids measured according to AOCS Ca 5a-40 and calculated as percentage oleic acid; b) reacting enzymatically, by using an immobilized lipase where the lipase is from *Rhizomucor miehei, Candida antarctica, Thermomyces lanuginosus* or *Rhizopus oryzae*, the provided fat composition with from 1% to 3% by weight of a polyol composition based on the weight of the provided fat composition, wherein the polyol composition consists of glycerol and the weight ratio of free fatty acid in the provided fat composition to the glycerol is from 0.5 to 10.0; and wherein the obtained randomly interesterified fat product has from 0.01% to 0.30% by weight of free fatty acids measured according to AOCS Ca 5a-40 and calculated as percentage oleic acid and a degree of randomization of from 80% to 100%; and c) refining the obtained randomly interesterified fat product, preferably by physical refining.

In another preferred embodiment, the method of preparing an edible randomly interesterified fat product according to the invention comprises the steps of: a) providing a fat composition comprising from 1.0% to 16% by weight of free fatty acids measured according to AOS Ca 5a-4 and calculated as percentage oleic acid and from 3% to 15% by weight of unsaponifiables; and b) reacting enzymatically, by using an immobilized lipase where the lipase is from *Rhizomucor miehei, Candida antarctica, Thermomyces lanuginosus* or *Rhizopus oryzae*, the provided fat composition with from 1% to 3% by weight of a polyol composition based on the weight of the provided fat composition, wherein the polyol composition consists of glycerol and the weight ratio of free fatty acid in the provided fat composition to the glycerol is from 0.5 to 10.0; and wherein the obtained randomly interesterified fat product has from 0.01% to 0.30% by weight of free fatty acids measured according to AOCS Ca 5a40 and calculated as percentage oleic acid and a degree of randomization of from 80% to 100%.

In an alternative preferred embodiment, the method of preparing an edible randomly interesterified fat product according to the invention comprises the steps of: a) providing a fat composition comprising from 1.0% to 16% by weight of free fatty acids measured according to AOS Ca 5a-40 and calculated as percentage oleic acid; and b) reacting enzymatically, by using an immobilized lipase where the lipase is from *Rhizomucor miehei, Candida antarctica, Thermomyces lanuginosus* or *Rhizopus oryzae*, the provided fat composition with from 1% to 3% by weight of a polyol composition based on the weight of the provided fat composition, wherein the polyol composition is a mixture of glycerol and propylene glycol and the weight ratio of free fatty acid in the provided fat composition to the polyol compound is from 0.5 to 10.0; and wherein the obtained randomly interesterified fat product has from 0.01% to 0.30% by weight of free fatty acids measured according to AOCS Ca 5a-40 and calculated as percentage oleic acid and a degree of randomization of from 80% to 100%.

According to the invention, the obtained randomly interesterified fat product of the method has a weight ratio of stearic acid (018:0) to oleic acid (C18:1) of preferably from 0.3:1 to 3:1, more preferably from 0.4:1 to 2.5:1, even more preferably from 0.4:1 to 2:1 and most preferably from 0.5:1 to 1.5:1.

Amounts of triglycerides specified herein are percentages by weight based on total triglycerides present in the fat composition. The notation triglyceride XYZ denotes triglycerides having fatty acid acyl groups X, Y and Z at any of the 1-, 2- and 3-positions of the glyceride. The notation A2B includes both AAB and ABA, and AB2 includes both ABB and BAB. Triglyceride content may be determined for example by GC (ISO 23275).

The obtained randomly interesterified fat product of the method according to the invention preferably comprises at least 1% by weight of StStSt (tristearin triglyceride), more preferably at least 1.5% by weight, even more preferably from 2.0% to 50% by weight and most preferably from 2.1% to 20% by weight.

Accordingly, in a preferred embodiment, the method of preparing an edible randomly interesterified fat product according to the invention comprises the steps of: a) providing a fat composition comprising from 0.5% to 20% by weight of free fatty acids measured according to AOCS Ca 5a-40 and calculated as percentage oleic acid; and b) reacting enzymatically, by using an immobilized lipase where the lipase is from *Rhizomucor miehei, Candida antarctica, Thermomyces lanuginosus* or *Rhizopus oryzae*, the provided fat composition with from 0.5% to 8% by weight of a polyol composition based on the weight of the provided fat composition, wherein the polyol composition is selected from glycerol, propylene glycol, polyglycerol and mixture thereof and the weight ratio of free fatty acid in the provided fat composition to the polyol compound is from 0.2 to 18.0; and wherein the obtained randomly interesterified fat product has less than 0.80% by weight of free fatty acids measured according to AOCS Ca 5a-40 and calculated as percentage oleic acid, a weight ratio of stearic acid (C18:0) to oleic acid (C18:1) of from 0.3:1 to 3:1 and at least 1% by weight of StStSt (tristearin triglyceride).

In a more preferred embodiment, the method of preparing an edible randomly interesterified fat product according to the invention comprises the steps of: a) providing a fat composition comprising from 0.5% to 18% by weight of free fatty acids measured according to AOCS Ca 5a-40 and calculated as percentage oleic acid; and b) reacting enzymatically, by using an immobilized lipase where the lipase is from *Rhizomucor miehei, Candida antarctica, Thermomyces lanuginosus* or *Rhizopus oryzae*, the provided fat composition with from 0.5% to 6% by weight of a polyol composition based on the weight of the provided fat composition, wherein the polyol composition is selected from glycerol, propylene glycol, polyglycerol and mixture thereof and the weight ratio of free fatty acid in the provided fat composition to the polyol compound is from 0.3 to 15.0; and wherein the obtained randomly interesterified fat product has from 0.01% to 0.50% by weight of free fatty acids measured according to AOCS Ca 5a-40 and calculated as percentage oleic acid, a weight ratio of stearic acid (C18:0) to oleic acid (C18:1) of from 0.4:1 to 2.5:1 and at least 1.5% by weight of StStSt (tristearin triglyceride).

In an even more preferred embodiment, the method of preparing an edible randomly interesterified fat product according to the invention comprises the steps of: a) providing a fat composition comprising from 0.8% to 17% by weight of free fatty acids measured according to AOCS Ca 5a-40 and calculated as percentage oleic acid; and b) reacting enzymatically, by using an immobilized lipase where the lipase is from *Rhizomucor miehei, Candida antarctica, Thermomyces lanuginosus* or *Rhizopus oryzae*, the provided fat composition with from 1% to 5% by weight of a polyol composition based on the weight of the provided fat composition, wherein the polyol composition is selected from glycerol, propylene glycol, polyglycerol and mixture thereof and the weight ratio of free fatty acid in the provided fat composition to the polyol compound is from 0.5 to 15.0; and wherein the obtained randomly interesterified fat product has from 0.01% to 0.40% by weight of free fatty acids measured according to AOS Ca 5a-40 and calculated as percentage oleic acid, a weight ratio of stearic acid (C18:0) to oleic acid (C18:1) of from 0.4:1 to 2:1 and from 2.0% to 50% by weight of StStSt (tristearin triglyceride).

In a most preferred embodiment, the method of preparing an edible randomly interesterified fat product according to the invention comprises the steps of: a) providing a fat composition comprising from 1.0% to 16% by weight of free fatty acids measured according to AOCS Ca 5a-40 and calculated as percentage oleic acid; and b) reacting enzymatically, by using an immobilized lipase where the lipase is from *Rhizomucor miehei, Candida antarctica, Thermomyces lanuginosus* or *Rhizopus oryzae*, the provided fat composition with from 1% to 3% by weight of a polyol composition based on the weight of the provided fat composition, wherein the polyol composition is glycerol and the weight ratio of free fatty acid in the provided fat composition to the polyol compound is from 0.5 to 10.0; and wherein the obtained randomly interesterified fat product has from 0.01% to 0.30% by weight of free fatty acids measured according to AOCS Ca 5a-40 and calculated as percentage oleic acid, a weight ratio of stearic acid (C18:0) to oleic acid (C18:1) of from 0.5:1 to 1.5:1 and from 2.1% to 20% by weight of StStSt (tristearin triglyceride).

In an additional preferred embodiment, the method of preparing an edible randomly interesterified fat product according to the invention comprises the steps of: a) providing a fat composition comprising from 1.0% to 16% by weight of free fatty acids measured according to AOCS Ca 5a-40 and calculated as percentage oleic acid; b) reacting enzymatically, by using an immobilized lipase where the lipase is from *Rhizomucor miehei, Candida antarctica, Thermomyces lanuginosus* or *Rhizopus oryzae*, the provided fat composition with from 1% to 3% by weight of a polyol composition based on the weight of the provided fat composition, wherein the polyol composition is glycerol and the weight ratio of free fatty acid in the provided fat composition to the polyol compound is from 0.5 to 10.0; and wherein the obtained randomly interesterified fat product has from 0.01% to 0.30% by weight of free fatty acids measured according to AOCS Ca 5a-40 and calculated as percentage oleic acid, a weight ratio of stearic acid (C18:0) to oleic acid (C18:1) of from 0.5:1 to 1.5:1 and from 2.1% to 20% by weight of StStSt (tristearin triglyceride); and c) refining the obtained randomly interesterified fat product where physical refining is more preferred.

In another preferred embodiment, the method of preparing an edible randomly interesterified fat product according to the invention comprises the steps of: a) providing a fat composition comprising from 1.0% to 16% by weight of free fatty acids measured according to AOCS Ca 5a-40 and calculated as percentage oleic acid and from 3% to 15% by weight of unsaponifiables; and b) reacting enzymatically, by using an immobilized lipase where the lipase is from *Rhizomucor miehei, Candida antarctica, Thermomyces lanuginosus* or *Rhizopus oryzae*, the provided fat composition with from 1% to 3% by weight of a polyol composition based on the weight of the provided fat composition, wherein the polyol composition is glycerol and the weight ratio of free fatty acid in the provided fat composition to the polyol compound is from 0.5 to 10.0; and wherein the obtained randomly interesterified fat product has from 0.01% to 0.30% by weight of free fatty acids measured according to AOCS Ca 5a-40 and calculated as percentage oleic acid, a weight ratio of stearic acid (C18:0) to oleic acid (C18:1) of from 0.5:1 to 1.5:1 and from 2.1% to 20% by weight of StStSt (tristearin triglyceride).

In an alternative preferred embodiment, the method of preparing an edible randomly interesterified fat product according to the invention comprises the steps of: a) providing a fat composition comprising from 1.0% to 16% by weight of free fatty acids measured according to AOCS Ca 5a-40 and calculated as percentage oleic acid; and b) reacting enzymatically, by using an immobilized lipase where the lipase is from *Rhizomucor miehei, Candida antarctica, Thermomyces lanuginosus* or *Rhizopus oryzae*, the provided fat composition with from 1% to 3% by weight of a polyol composition based on the weight of the provided fat composition, wherein the polyol composition is a mixture of glycerol and propylene glycol and the weight ratio of free fatty acid in the provided fat composition to the polyol compound is from 0.5 to 10.0; and wherein the obtained randomly interesterified fat product has less than 1.0% by weight of free fatty acids measured according to AOCS Ca 5a-40 and calculated as percentage oleic acid, a weight ratio of stearic acid (C18:0) to oleic acid (C18:1) of from 0.5:1 to 1.5:1 and from 2.1% to 20% by weight of StStSt (tristearin triglyceride).

The term "triglyceride" (TAG) refers to glycerides consisting of three fatty acid chains covalently bonded to a glycerol molecule. The term "diglyceride" (DAG) refers to a glyceride consisting of two fatty acid chains covalently bonded to a glycerol molecule, not necessarily limited to specific positions on the glycerol backbone (1,3- or 1,2- positions). The term "monoglyceride" (MAG) refers to a glyceride consisting of one fatty acid chain covalently bonded to a glycerol molecule, not necessarily limited to specific positions on the glycerol backbone (1, 2 or 3-position). Triglyceride content, diglyceride content and monoglyceride content may be determined for example by high performance size exclusion chromatography according to ISO 18395:2005(E).

According to the invention, the obtained randomly interesterified fat product of the method preferably comprises from 0.01% to 5% by weight of monoglycerides, more preferably from 0.05% to 4% by weight, even more preferably from 0.1% to 3% by weight and most preferably from 0.2% to 3% by weight.

The obtained randomly interesterified fat product of the method according to the invention preferably comprises from 1% to 35% by weight of diglycerides, more preferably from 5% to 35% by weight, even more preferably from 10% to 35% and most preferably from 10% to 32% by weight.

The presence of monoglycerides and diglycerides which are generated in situ in the obtained randomly interesterified fat product produced according to the method of the invention provides the randomly interesterified fat product with an additional emulsifying function without any added additional emulsifier. This property is particularly suitable in applications where emulsification is involved, such as margarine.

When propylene glycol is used in the polyol composition of step b) of the method according to the invention, propylene glycol esters may also be generated in situ in the obtained randomly interesterified fat product. Polyglycerol esters of fatty acids may also be generated in situ in the obtained randomly interesterified fat product produced according to the method of the invention when polyglycerol is used. Different generated emulsifiers such as propylene glycol esters and polyglycerol esters provide the obtained randomly interesterified fat product with emulsifying properties without any added additional emulsifier.

Accordingly, in a preferred embodiment, the method of preparing an edible randomly interesterified fat product according to the invention comprises the steps of: a) providing a fat composition comprising from 0.5% to 20% by weight of free fatty acids measured according to AOCS Ca 5a-40 and calculated as percentage oleic acid; and b) reacting enzymatically, by using an immobilized lipase where the lipase is from *Rhizomucor miehei, Candida antarctica, Thermomyces lanuginosus* or *Rhizopus oryzae*, the provided fat composition with from 0.5% to 8% by weight of a polyol composition based on the weight of the provided fat composition, wherein the polyol composition consists of glycerol and the weight ratio of free fatty acid in the provided fat composition to the glycerol is from 0.2 to 18.0; and wherein the obtained randomly interesterified fat product has less than 0.80% by weight of free fatty acids measured according to AOCS Ca 5a-40 and calculated as percentage oleic acid, a weight ratio of stearic acid (C18:0) to oleic acid (C18:1) of from 0.3:1 to 3:1, at least 1% by weight of StStSt (tristearin triglyceride), from 0.01% to 5% by weight of monoglycerides and from 1% to 35% by weight of diglycerides.

In a more preferred embodiment, the method of preparing an edible randomly interesterified fat product according to the invention comprises the steps of: a) providing a fat composition comprising from 0.5% to 18% by weight of free fatty acids measured according to AOCS Ca 5a-40 and calculated as percentage oleic acid; and b) reacting enzymatically, by using an immobilized lipase where the lipase is from *Rhizomucor miehei, Candida antarctica, Thermomyces lanuginosus* or *Rhizopus oryzae*, the provided fat composition with from 0.5% to 6% by weight of a polyol composition based on the weight of the provided fat composition, wherein the polyol composition consists of glycerol and the weight ratio of free fatty acid in the provided fat composition to the glycerol is from 0.3 to 15.0; and wherein the obtained randomly interesterified fat product has from 0.01% to 0.50% by weight of free fatty acids measured according to AOCS Ca 5a-40 and calculated as percentage oleic acid, a weight ratio of stearic acid (C18:0) to oleic acid (C18:1) of from 0.4:1 to 2.5:1, at least 1.5% by weight of StStSt (tristearin triglyceride), from 0.05% to 4% by weight of monoglycerides and from 5% to 35% by weight of diglycerides.

In an even more preferred embodiment, the method of preparing an edible randomly interesterified fat product according to the invention comprises the steps of: a) providing a fat composition comprising from 0.8% to 17% by weight of free fatty acids measured according to AOCS Ca 5a-40 and calculated as percentage oleic acid; and b) reacting enzymatically, by using an immobilized lipase where the lipase is from *Rhizomucor miehei, Candida antarctica, Thermomyces lanuginosus* or *Rhizopus oryzae*, the provided fat composition with from 1% to 5% by weight of a polyol composition based on the weight of the provided fat composition, wherein the polyol composition consists of glycerol and the weight ratio of free fatty acid in the provided fat composition to the glycerol is from 0.5 to 15.0; and wherein the obtained randomly interesterified fat product has from 0.01% to 0.40% by weight of free fatty acids measured according to AOCS Ca 5a-40 and calculated as percentage oleic acid, a weight ratio of stearic acid (C18:0) to oleic acid (C18:1) of from 0.4:1 to 2:1, from 2.0% to 50% by weight of StStSt(tristearin triglyceride), from 0.1% to 3% by weight of monoglycerides and from 20% to 35% by weight of diglycerides.

In a most preferred embodiment, the method of preparing an edible randomly interesterified fat product according to the invention comprises the steps of: a) providing a fat composition comprising from 1.0% to 16% by weight of free fatty acids measured according to ACOS Ca 5a-0 and calculated as percentage oleic acid; and b) reacting enzymatically, by using an immobilized lipase where the lipase isfrom *Rhizoucor miehei, Candida antarctica, Thermomyces lanuginosus* or *Rhizopus oryzae*, the provided fat composition with from 1% to 3% by weight of a polyol composition based on the weight of the provided fat composition, wherein the polyol composition consists of glycerol and the weight ratio of free fatty acid in the provided fat composition to the glycerol is from 0.5 to 10.0; and wherein the obtained randomly interesterified fat product has from 0.01% to 0.30% by weight of free fatty acids measured according to AOCS Ca 5a-40 and calculated as percentage oleic acid, a weight ratio of stearic acid (018:0) to oleic acid (C18:1) of from 0.5:1 to 1.5:1, from 2.1% to 20% by weight of StStSt (tristearin triglyceride), from 0.2% to 3% by weight of monoglycerides and from 10% to 32% by weight of diglycerides. The invention also relates to the use of an edible randomly interesterified fat product produced according to the method of the invention in a food application, such as confectionery, bakery or culinary. Preferably, the edible randomly interesterified fat product produced according to the method of the invention is used in creams, spreads, fillings, coatings, margarines or shortenings.

In one aspect, a confectionery product produced from the edible randomly interesterified fat product produced according to the method of the invention is typically a chocolate-like product and may, for example, be selected from bars, fillings, biscuit creams and confectionery coatings. Fillings are preferred. The confectionery products will preferably comprise one or more further ingredients such as skimmed milk powder, cocoa butter, nut based material (e.g., hazelnut pieces and/or hazelnut paste) and emulsifier (e.g., lecithin, PGPR, sorbitan tristearate or a mixture thereof). Further optional components include flavoring (e.g., vanilla, vanillin, mint, orange, etc.), colorants and inclusions such as confectionery and fruit pieces.

In another aspect, margarines may be formed by mixing the edible randomly interesterified fat product produced according to the method of the invention with an aqueous phase to form a water-in-oil emulsion. Preferably, no additional emulsifier is required. The amounts of fat and aqueous phase typically range from 10-90% by weight fat and 90-10% by weight aqueous phase, such as from 20-80% by weight fat and 80-20% by weight aqueous phase or from 30-70% by weight fat and 70-30% by weight aqueous phase. Further components of margarines include one or more of coloring agents (such as beta-carotene), flavoring agents (for example, salt and/or citric acid) and preservatives (e.g., potassium sorbate); typically, these components are present in an amount of less than 5% (such as 0.1 to 3%) by weight of the margarine. The preparation of margarines from a vegetable fat and an aqueous phase is well-known to those skilled in the art. Margarines typically comprise from about 80 to 90% by weight of fat phase. The margarines may be packaged, for example in tubs or wrappers.

In a further aspect, the edible randomly interesterified fat product produced according to the method of the invention may be used in a whipped cream application. Whipped cream is typically an oil-in-water emulsion that incorporates a suspended gas such as air.

Whipped creams may comprise the edible randomly interesterified fat product produced according to the method of the invention, water and optionally one or more of sugar, skimmed milk powder and optionally emulsifier. Typically, a whipped cream comprises 10% to 50% by weight sugar, 20% to 50% by weight fat, 10% to 40% by weight water, optionally up to 10% by weight skimmed milk powder and optionally up to 5% by weight emulsifier.

The listing or discussion of an apparently prior-published document in this specification should not necessarily be taken as an acknowledgement that the document is part of the state of the art or is common general knowledge.

Preferences and options for a given aspect, embodiment, feature or parameter of the invention should, unless the context indicates otherwise, be regarded as having been disclosed in combination with any and all preferences and options for all other aspects, embodiments, features and parameters of the invention.

The following non-limiting examples illustrate the invention and do not limit its scope in any way. In the examples and throughout this specification, all percentages, parts and ratios are by weight unless indicated otherwise.

EXAMPLES

Throughout these Examples:
FFA as oleic acid refers to free fatty acid content measured according to AOCS Ca 5a-40 and calculated as percentage oleic acid;
Cx:y refers to a fatty acid having x carbon atoms and y double bonds; levels determined by GC-FAME (ISO 12966-2 and ISO 12966-4);
O, P, St and L refer to oleic, palmitic, stearic and linoleic, respectively;

Triglyceride composition POSt, etc, was determined by GC (ISO 23275) and includes triglycerides having the same fatty acids in different positions e.g., POSt includes PStO and StPO;

US-Nx refers to solid fat content determined by NMR on unstabilised fat at x° C. (ISO 8292-1);

Unsaponifialbes percentages are measured according to AOCS Ca 6a-40;

Yellow color and red color refer to color measurement in 1 inch (25.4 mm) cuvette by means of Lovibond Tintometer (ISO 15305); and TAG/DAG/MAG are determined according to ISO 18395: 2005(E).

Example 1

Crude shea olein is obtained by solvent fractionation of crude shea butter. 800 g crude shea olein with 16 g glycerol (2% by weight based on total fat composition) was prepared in a glass vessel and mixed with nitrogen gas from the bottom at 70° C. The weight ratio of free fatty acid in the fat composition to glycerol is thus 7.5 calculated as 15/2. The reaction was catalyzed by immobilized lipase originating from *Rhizomucor miehei* immobilized on macroporous anionic resin (Novozym® 40086). When the reaction was completed, after approximatively 24 hours, the product was filtered.

The commercially available fat Creamelt® Stand was considered as reference, as obtained from Bunge Loders Croklaan B.V., the Netherlands. Creamelt® Stand is chemically interesterified shea olein and during the processing the extra free fatty acids were removed by distillation prior to chemical interesterification. The analytical results of the crude shea olein, the reference product and the product obtained by the inventive process are shown in table 1.

TABLE 1

Fat compositions—crude shea olein, reference (Creamelt ® Stand) and enzymatically interesterified crude shea olein according to the invention.

|  | Crude shea olein | Fat product 1 | Reference (Creamelt ® Stand) |
| --- | --- | --- | --- |
| FFA as oleic acid | 15 | 0.25 | 0.07 |
| PStSt | 0.1 | 1.2 | 1.5 |
| POSt | 4.3 | 5.8 | 5.1 |
| StStSt | 0.1 | 2.3 | 2.8 |
| StOSt | 10.1 | 18.9 | 17.6 |
| StOO | 47.8 | 31 | 27.8 |
| StLSt | 3.1 | 1.2 | 1.6 |
| OOO | 9.2 | 14.3 | 16.4 |
| StLO | 8.4 | 8.1 | 7.6 |
| OLO | 2.1 | 5.3 | 6.5 |
| StLL | 1.3 | 0.5 | 0.6 |
| C16:0 | 5.0 | 5.0 | 4.7 |
| C18:0 | 32.5 | 32.2 | 30.2 |
| C18:1 | 51.8 | 52.1 | 54.3 |
| C18:2 | 8.0 | 8.0 | 8.3 |
| US-N0 | 24 | 32 | 28 |
| US-N5 | 15 | 25 | 23 |
| US-N10 | 9 | 17 | 15 |
| US-N15 | 7 | 13 | 11 |
| US-N20 | 6 | 10 | 8 |
| Unsaponifiables | 6.3 | * | * |

The results show that without removing free fatty acids from crude shea olein, similar triglyceride composition and solid fat content profile of the randomly interesterified fat product can be obtained by the method according to this invention compared to conventional chemically interesterified shea olein. The degree of randomization of Fat product 1 can be calculated based on the triglyceride that was decreasing the most during the reaction (StOO in this example) by considering 100% randomization in the reference sample. Therefore, the degree of randomization is then (StOO (in crude shea olein)−StOO (in Fat product 1))/(StOO (in crude shea olein)−StOO (in Reference 1))×100%, which is 84%.

Comparative Example 1

300 g crude shea olein with 6 g glycerol (2% by weight based on total fat composition) was prepared and heated to 110° C. and dried for 30 min under vacuum at a pressure of about 10 mbar. To this dried oil was added sodium methoxide (0.10% w/w) and the mixture was stirred for 30 min at about 10 mbar. After this, the reaction was stopped by adding citric acid and the formed soap was removed by silica gel. The analytical results of the crude shea olein, the reference product and the comparative example product are shown in table 2.

TABLE 2

Fat compositions—crude shea olein, reference (Creamelt Stand®) and chemical interesterified crude shea olein.

|  | Crude shea olein | Comparative fat product 1 | Reference 1 (Creamelt ® Stand) |
| --- | --- | --- | --- |
| FFA as oleic acid | 15 | 15 | 0.07 |
| PStSt | 0.1 | 0.1 | 1.5 |
| POSt | 4.3 | 4.2 | 5.1 |
| StStSt | 0.1 | 0.2 | 2.8 |
| StOSt | 10.1 | 11.0 | 17.6 |
| StOO | 47.8 | 46.7 | 27.8 |
| StLSt | 3.1 | 3.3 | 1.6 |
| OOO | 9.2 | 9.0 | 16.4 |
| StLO | 8.4 | 8.0 | 7.6 |
| OLO | 2.1 | 2.1 | 6.5 |
| StLL | 1.3 | 1.3 | 0.6 |
| C16:0 | 5.0 | 5.1 | 4.7 |
| C18:0 | 32.5 | 32.7 | 30.2 |
| C18:1 | 51.8 | 51.3 | 54.3 |
| C18:2 | 8.0 | 8.1 | 8.3 |
| US-N0 | 24 | 24 | 28 |
| US-N5 | 15 | 15 | 23 |
| US-N10 | 9 | 10 | 15 |
| US-N15 | 7 | 8 | 11 |
| US-N20 | 6 | 6 | 8 |

The results show that without removing free fatty acid, crude shea olein cannot be interesterified chemically since no significant change of triglyceride composition and/or solid fat content profile is observed between crude shea olein and Comparative fat product 1. The degree of randomization of Comparative fat product 1 can be calculated based on the triglyceride that was decreasing the most during reaction (StOO in this example) by considering 100% randomization in the reference sample. Therefore, the degree of randomization is then (StOO (in crude shea olein)−StOO (in Comparative fat product 1))/(StOO (in crude shea olein)−StOO (in Reference 1))×100, which is merely 5.5%.

Example 2

800 g crude shea olein with 16 g glycerol (2% by weight based on total fat composition) was prepared in a glass vessel and mixed with nitrogen gas from the bottom at 70° C. The reaction was catalyzed by immobilized lipase originating from *Rhizomucor miehei* immobilized on macroporous anionic resin (Novozym® 40086). When the reaction was completed, after approximatively 24 hours, the product was filtered. The filtered enzyme was reused again with the new preparation of about 800 g crude shea olein with 16 g glycerol. The filtered enzyme was reused twelve times. In the product of each batch, the solid fat content profile was measured in order to monitor the enzyme stability performance. The results are shown in the following table 3.

TABLE 3

Monitoring of solid fat content profile during enzyme stability test

|       | Batch 1 | Batch 2 | Batch 3 | Batch 4 | Batch 5 | Batch 6 | Batch 7 | Batch 8 | Batch 9 | Batch 10 | Batch 11 | Batch 12 |
|-------|---|---|---|---|---|---|---|---|---|---|---|---|
| US-N0  | 31 | 32 | 32 | 31 | 32 | 32 | 32 | 32 | 32 | 31 | 31 | 32 |
| US-N10 | 17 | 18 | 18 | 17 | 17 | 18 | 17 | 17 | 18 | 17 | 17 | 18 |
| US-N20 | 10 | 10 | 10 | 10 | 11 | 10 | 10 | 10 | 10 | 9  | 9  | 10 |
| US-N30 | 6  | 6  | 6  | 6  | 6  | 6  | 6  | 5  | 6  | 5  | 5  | 6  |
| US-N40 | 1  | 2  | 2  | 2  | 2  | 2  | 2  | 2  | 3  | 2  | 3  | 3  |

The results show that the enzyme performance is considerably good and stable for this process despite of the presence of high free fatty acid content in the starting material (crude shea olein).

Example 3

600 g crude shea olein with 12 g glycerol (2% by weight based on total fat composition) was prepared in a glass vessel and mixed with nitrogen gas from the bottom at 70° C. The weight ratio of free fatty acid in the fat composition to glycerol is thus 7.2 calculated as 1447/2. The reaction was catalyzed by immobilized lipase originating from *Candida antarctica* B immobilized on macroporous acrylic resin (Novozym® 435). When the reaction was completed, after approximatively 24 hours, the product was filtered. Subsequently, the product was bleached with 1.5% acid-activated bleaching earth for 30 minutes at 90° C. and deodorized in a batch deodorizer at 230° C. for 4 hours under vacuum of 0.05-0.2 mbar. The analytical results of the crude shea olein and the product obtained via the invented process are shown in table 4.

TABLE 4

Fat compositions—crude shea olein and enzymatically interesterified crude shea olein.

|                  | Crude shea olein | Fat product 3 |
|------------------|------------------|---------------|
| FFA as oleic acid | 14.47 | 0.11 |
| PStSt | 0.1 | 1.7 |
| POSt  | 4.5 | 5 |
| StStSt | 0.3 | 3.8 |
| StOSt | 14.5 | 19.3 |
| StOO  | 41.2 | 27.7 |
| StLSt | 4 | 2.2 |
| OOO   | 8.3 | 13.9 |
| StLO  | 7.6 | 7.8 |
| OLO   | 2 | 5.9 |
| StLL  | 1.2 | 0.5 |
| C16:0 | 4.5 | 4.5 |
| C18:0 | 33.4 | 33.2 |
| C18:1 | 51.6 | 51.8 |
| C18:2 | 7.9 | 7.8 |
| US-N0 | 25 | 33 |
| US-N5 | 17 | 27 |
| US-N10 | 11 | 20 |
| US-N15 | 8 | 13 |
| US-N20 | 7 | 10 |
| Yellow color | 21 | 12 |
| Red color | 2.8 | 2.1 |

Example 3.1

The same crude shea olein from Example 3 was firstly distilled in order to remove the excess free fatty acids prior to chemical interesterification by means of short path distillation at a temperature of about 200° C. and a pressure of about 8×10⁻³ mbar. About 300 g distilled shea olein was prepared and heated to 110° C. and dried for 30 min under vacuum at a pressure of about 10 mar. To this dried oil was added sodium methoxide (0.2% w/w) and the mixture was stirred for 30 min at about 10 mbar. After this, the reaction was stopped by adding citric acid and the formed soap was removed by silica gel. Subsequently, the product was bleached with 1.5% acid-activated bleaching earth for 30 minutes at 90° C. and deodorized in a batch deodorizer at 230° C. for 4 hours under vacuum of 0.05-0.2 mbar. The analytical results of the crude shea olein, the distilled shea olein and the comparative example product 3.1 are shown in table 5.

TABLE 5

Fat compositions—crude shea olein, distilled shea olein and chemically interesterified distilled shea olein.

|  | Crude shea olein | Distilled shea olein | Comparative fat product 3.1 |
|---|---|---|---|
| FFA as oleic acid | 14.47 | 0.3 | 0.11 |
| PStSt | 0.1 | 0.1 | 1.7 |
| POSt | 4.5 | 4.1 | 5 |
| StStSt | 0.3 | 0.3 | 3.3 |
| StOSt | 14.5 | 12 | 17.1 |
| StOO | 41.2 | 46.4 | 28 |
| StLSt | 4 | 3.7 | 0.9 |
| OOO | 8.3 | 9.3 | 16.1 |
| StLO | 7.6 | 8.3 | 7.4 |
| OLO | 2 | 2.1 | 6.7 |
| StLL | 1.2 | 1.3 | 0.4 |
| C16:0 | 4.5 | 4.7 | 4.6 |
| C18:0 | 33.4 | 30.9 | 31.1 |
| C18:1 | 51.6 | 53.7 | 53.7 |
| C18:2 | 7.9 | 8.1 | 8 |
| US-N0 | 25 | 26 | 30 |
| US-N5 | 17 | 16 | 24 |
| US-N10 | 11 | 5 | 17 |
| US-N15 | 8 | 2 | 11 |
| US-N20 | 7 | 1 | 9 |
| Yellow color | 21 | 24 | 18 |
| Red color | 2.8 | 3.7 | 2.8 |

Comparative Example 3.2

The same crude shea olein from Example was firstly distilled in order to remove the excess free fatty acids prior to enzymatic interesterification by means of short path distillation at a temperature of about 200° C. and a pressure of about $8 \times 10^{-3}$ mbar. In total about 400 g distilled shea olein was prepared and heated to 60° C. The reaction was catalyzed by immobilized lipase originating from *Candida antarctica* B immobilized on macroporous acrylic resin (Novozym® 435). When the reaction was completed, after approximatively 24 hours, the product was filtered. Subsequently, the product was bleached with 1.5% acid-activated bleaching earth for 30 minutes at 90° C. and deodorized in a batch deodorizer at 230° C. for 4 hours under vacuum of 0.05-02 mbar. The analytical results of the crude shea olein, the distilled shea olein and the comparative example product 3.2 are shown in table 6.

TABLE 6

Fat compositions—crude shea olein, distilled shea olein and enzymatically interesterified distilled shea olein.

|  | Crude shea olein | Distilled shea olein | Comparative fat product 3.2 |
|---|---|---|---|
| FFA as oleic acid | 14.47 | 0.3 | 0.1 |
| PStSt | 0.1 | 0.1 | 1.3 |
| POSt | 4.5 | 4.1 | 4.8 |
| StStSt | 0.3 | 0.3 | 2.6 |
| StOSt | 14.5 | 12 | 16.5 |
| StOO | 41.2 | 46.4 | 29.6 |
| StLSt | 4 | 3.7 | 2.3 |
| OOO | 8.3 | 9.3 | 14.6 |
| StLO | 7.6 | 8.3 | 7.9 |
| OLO | 2 | 2.1 | 5.5 |
| StLL | 1.2 | 1.3 | 0.7 |
| C16:0 | 4.5 | 4.7 | 4.6 |
| C18:0 | 33.4 | 30.9 | 31 |
| C18:1 | 51.6 | 53.7 | 53.8 |
| C18:2 | 7.9 | 8.1 | 8 |
| US-N0 | 25 | 26 | 28 |
| US-N5 | 17 | 16 | 22 |
| US-N10 | 11 | 5 | 15 |
| US-N15 | 8 | 2 | 9 |
| US-N20 | 7 | 1 | 7 |
| Yellow color | 21 | 24 | 17 |
| Red color | 2.8 | 3.7 | 2.8 |

The results show that the product in Example 3 without deacidification (distillation of free fatty acids) prior to enzymatic interesterification according to the method of the invention has surprisingly desirably lighter yellow and red color after refining compared to the product in Comparative example 3.1 with deacidification (distillation of free fatty acids) prior to chemical interesterification and the product in Comparative example 3.2 with deacidification prior to enzymatic interesterification. The process according to the invention not only improves the efficiency of the process without losing a significant amount of fatty acids (approximatively 15% yield improvement) but also allows the production of a fat product with superior quality such as desirably light color.

Example 4

600 g crude shea butter with 12 g glycerol (2% by weight based on total fat composition) was prepared in a glass vessel and mixed with nitrogen gas from the bottom at 70° C. The weight ratio of free fatty acid in the fat composition to glycerol is thus about 3.1 calculated as 6.27/2. The reaction was catalyzed by immobilized lipase originating from *Rhizomucor miehei* immobilized on macroporous anionic resin (Novozym® 40086). When the reaction was completed, after approximatively 24 hours, the product was filtered.

Chemically interesterified shea butter is considered as a reference to demonstrate the degree of interesterification based on triglyceride composition. Before chemical interesterification, free fatty acids need to be removed by distillation/deodorization as well known in the art. The analytical results of the crude shea butter, the product by the invented process and the reference are shown in table 7.

TABLE 7

Fat compositions—crude shea butter, enzymatically interesterified crude shea butter according to the invention and the reference.

|  | Crude shea butter | Fat product 4 | Reference 2 (chemically interesterified shea butter) |
|---|---|---|---|
| FFA as oleic acid | 6.27 | 0.15 | 0.6 |
| PStSt | 0.2 | 1.6 | 2.6 |
| POSt | 5 | 4.8 | 4.7 |
| StStSt | 1.1 | 5.7 | 7.6 |
| StOSt | 40.3 | 27.6 | 26.7 |
| StOO | 27.2 | 27.6 | 26.4 |
| StLSt | 4.5 | 3.2 | 2.3 |
| OOO | 5.1 | 8.8 | 8.9 |
| StLO | 4.6 | 7 | 6.9 |
| OLO | 1.3 | 3.2 | 3.5 |
| StLL | 0.8 | 0.4 | 0.5 |
| C16:0 | 3.9 | 3.7 | 3.6 |

TABLE 7-continued

Fat compositions—crude shea butter, enzymatically interesterified crude shea butter according to the invention and the reference.

|  | Crude shea butter | Fat product 4 | Reference 2 (chemically interesterified shea butter) |
|---|---|---|---|
| C18:0 | 42.1 | 42.6 | 41.7 |
| C18:1 | 45.0 | 45.0 | 45.1 |
| C18:2 | 6.5 | 6.1 | 6.9 |
| US-N10 | 47 | 34 | 33 |
| US-N20 | 31 | 20 | 18 |
| US-N25 | 12 | 17 | 15 |
| US-N30 | 2 | 12 | 13 |
| US-N35 | 0 | 9 | 10 |
| US-N40 | 0 | 6 | 7 |
| Unsaponifiables | 5.5 | * | * |

The results show that without removing free fatty acids from crude shea butter, similar triglyceride composition and solid fat content profile of the randomly interesterified fat product can be obtained by the method according to this invention compared to conventional chemically interesterified shea butter. The degree of randomization of Fat product 4 can be calculated based on the triglyceride that was decreasing the most during reaction (StOSt in this example) by considering 100% randomization in the reference sample. Therefore, the degree of randomization is then (StOSt (in crude shea butter)−StOSt (in Fat product 4))/(StOSt (in crude shea butter)−StOSt (in Reference 2))×100%, which is 93.4%.

Example 5

560 g crude shea olein and 240 shea stearin with 16 g glycerol (2% by weight based on total fat composition) was prepared in a glass vessel and mixed with nitrogen gas from the bottom at 70° C. The weight ratio of free fatty acid in the fat composition to glycerol is thus 5.5 calculated as 1112. The reaction was catalyzed by immobilized lipase originating from *Candida Antarctica* 8 immobilized on macroporous acrylic resin (Novozym® 435). When the reaction was completed, after approximatively 24 hours, the product was filtered. The analytical results of the crude shea olein/shea stearin blend and the product obtained by the inventive process are shown in table 8.

TABLE 8

Fat composition—crude shea olein/shea stearin blend and enzymatically interesterified crude shea olein/shea stearin blend according to the invention.

|  | Crude shea olein/shea stearin = 70/30 (w/w) | Fat product 5 |
|---|---|---|
| FFA as oleic acid | 11 | 0.19 |
| PStSt | 0.1 | 2.5 |
| POSt | 4.8 | 6.7 |
| StStSt | 1 | 6.2 |
| StOSt | 34.6 | 27.9 |
| StOO | 28.1 | 24.3 |
| StLSt | 4.2 | 2.9 |
| OOO | 5.2 | 8.5 |
| StLO | 4.9 | 6.1 |
| OLO | 1.3 | 2.8 |
| StLL | 0.8 | 0 |
| C16:0 | 4.6 | 4.5 |
| C18:0 | 41.2 | 41.4 |
| C18:1 | 45.1 | 44.7 |
| C18:2 | 6.6 | 6.5 |
| US-N10 | 42 | 34 |
| US-N15 | 33 | 25 |
| US-N20 | 21 | 21 |
| US-N25 | 6 | 18 |
| US-N30 | 3 | 14 |
| US-N35 | 1 | 11 |
| US-N40 | 0 | 7 |

Example 6

600 g crude shea olein (the same crude shea olein as in Example 1) with 12 g glycerol (2% by weight based on total fat composition) was prepared in a glass vessel and mixed with nitrogen gas from the bottom at 70° C. The weight ratio of free fatty acid in the fat composition to glycerol is thus 7.5 calculated as 15/2. The reaction was catalyzed by immobilized lipase originating from *Rhizopus oryzae* immobilized on polypropylene (Accurel®). When the reaction was completed, after approximatively 24 hours, the product was filtered. The analytical results of the product obtained by the inventive process are shown in table 9.

TABLE 9

Fat composition—enzymatically interesterified crude shea olein according to the invention.

|  | Fat product 6 |
|---|---|
| FFA as oleic acid | 0.13 |
| PStSt | 1.6 |
| POSt | 5.8 |
| StStSt | 2.9 |
| StOSt | 18.8 |
| StOO | 26.7 |
| StLSt | 2.8 |
| OOO | 13.1 |
| StLO | 8.4 |
| OLO | 5.8 |
| StLL | 0.6 |
| C16:0 | 5.2 |
| C18:0 | 32.5 |
| C18:1 | 51.3 |
| C18:2 | 8.1 |
| US-N0 | 33 |
| US-N5 | 26 |
| US-N10 | 17 |
| US-N15 | 13 |
| US-N20 | 10 |

Example 7

600 g crude shea olein (the same crude shea olein as in Example 1) with 24 g glycerol (4% by weight based on total fat composition) was prepared in a glass vessel and mixed with nitrogen gas from the bottom at 70° C. The weight ratio of free fatty acid in the fat composition to glycerol is thus about 3.8 calculated as 15/4. The reaction was catalyzed by immobilized lipase originating from *Candida antarctica* B immobilized on macroporous acrylic resin (Novozym® 435). When the reaction was completed, after approximatively 24 hours, the product was filtered. The analytical results of the product obtained by the inventive process are shown in table 10.

TABLE 10

Fat composition—enzymatically interesterified crude shea olein according to the invention.

|  | Fat product 7 |
|---|---|
| FFA as oleic acid | 0.19 |
| PStSt | 1.6 |
| POSt | 4.7 |
| StStSt | 3.9 |
| StOSt | 19.5 |
| StOO | 27.7 |
| StLSt | 2.4 |
| OOO | 14.3 |
| StLO | 8.4 |
| OLO | 6.3 |
| StLL | 0.6 |
| C16:0 | 4 |
| C18:0 | 33.2 |
| C18:1 | 51.8 |
| C18:2 | 8.2 |
| US-N0 | 37 |
| US-N5 | 32 |
| US-N10 | 28 |
| US-N15 | 23 |
| US-N20 | 18 |

Example 8

600 g cocoa butter with 6 g glycerol (1% by weight based on total fat composition) was prepared in a glass vessel and mixed with nitrogen gas from the bottom at 7000. The weight ratio of free fatty acid in the fat composition to glycerol is thus about 1.0 calculated as 1.01/1. The reaction was catalyzed by immobilized lipase originating from *Candida antarctica* B immobilized on macroporous acrylic resin (Novozym® 435). When the reaction was completed, after approximatively 24 hours, the product was filtered.

Chemically interesterified cocoa butter is considered as a reference to demonstrate the degree of interesterification based on triglyceride composition. Before chemical interesterification, free fatty acids need to be removed either by distillation/deodorization or by chemical neutralization as well known in the art. The analytical results of cocoa butter, the product obtained by the inventive process and the reference are shown in table 11.

TABLE 11

Fat composition—cocoa butter, enzymatically interesterified cocoa butter according to the invention and the reference.

|  | Cocoa butter | Fat product 8 | Reference 3 (chemically interesterified cocoa butter) |
|---|---|---|---|
| FFA as oleic acid | 1.01 | 0.06 | 0.1 |
| PPP | 0 | 2.3 | 2.4 |
| PPSt | 0.5 | 8.3 | 8.6 |
| POP | 15.6 | 7.8 | 7.4 |
| PLP | 1.7 | 0.9 | 1 |
| PStSt | 0.8 | 10.5 | 11 |
| POSt | 39.7 | 20.5 | 19.3 |
| POO | 2.1 | 8.5 | 8.8 |
| PLSt | 3.2 | 1.6 | 1.9 |
| PLO | 0.3 | 1.4 | 1.8 |
| StStSt | 0.4 | 4.8 | 4.9 |
| StOSt | 28.6 | 14.9 | 13.7 |
| StOO | 2.8 | 9.9 | 10.4 |
| StLSt | 1.7 | 0.9 | 1 |
| OOO | 0.1 | 2.8 | 3.1 |
| OLO | 0.1 | 0.7 | 0.7 |
| StLO | 0.3 | 1.5 | 1.9 |
| C16:0 | 25.5 | 25.6 | 25.9 |
| C18:0 | 36.4 | 36.3 | 36.1 |
| C18:1 | 33 | 33 | 32.8 |
| C18:2 | 2.8 | 2.8 | 3.4 |
| TAG | ** | 68.5 | * |
| DAG | * | 29.1 | * |
| MAG | * | 2.1 | * |

The results show that without removing free fatty acids from cocoa butter, a similar randomly interesterified fat product can be obtained by the process according to this invention. Moreover, mono- and diglycerides are also generated from this process where the content of monoglyceride in the fat product is 2.1% by weight. The generated mono- and diglycerides could provide the randomly interesterified fat product with additional emulsifying properties. The degree of randomization of Fat product 8 can be calculated based on the triglyceride that was decreasing the most during reaction (POSt in this example) by considering 100% randomization in the reference sample. Therefore, the degree of randomization is then (POSt (in cocoa butter)−POSt (in Fat product 8))/(POSt (in cocoa butter)−POSt (in Reference 3))×100%, which is 94.1%.

Example 9

600 g cocoa butter with 12 g glycerol (2% by weight based on total fat composition) was prepared in a glass vessel and mixed with nitrogen gas from the bottom at 70° C. The weight ratio of free fatty acid in the fat composition to glycerol is thus about 0.5 calculated as 1.01/1. The reaction was catalyzed by immobilized lipase originating from *Candida antarctica* B immobilized on macroporous acrylic resin (Novozym® 435). When the reaction was completed, after approximatively 24 hours, the product was filtered.

Chemically interesterified cocoa butter is considered as a reference to demonstrate the degree of interesterification based on triglyceride composition. Before chemical interesterification, free fatty acids need to be removed either by distillation/deodorization or by chemical neutralization as well known in the art. The analytical results for cocoa butter, the product obtained by the inventive process and the reference are shown in table 12.

TABLE 12

Fat composition—cocoa butter, enzymatically interesterified cocoa butter according to the invention and the reference.

|  | Cocoa butter | Fat product 9 | Reference 3 (chemically interesterified cocoa butter) |
|---|---|---|---|
| FFA as oleic acid | 1.01 | 0.06 | 0.1 |
| PPP | 0 | 2.4 | 2.4 |
| PPSt | 0.5 | 8.4 | 8.6 |
| POP | 15.6 | 8.3 | 7.4 |
| PLP | 1.7 | 1 | 1 |
| PStSt | 0.8 | 9.9 | 11 |
| POSt | 39.7 | 20.9 | 19.3 |

TABLE 12-continued

Fat composition—cocoa butter, enzymatically interesterified cocoa butter according to the invention and the reference.

| | Cocoa butter | Fat product 9 | Reference 3 (chemically interesterified cocoa butter) |
|---|---|---|---|
| POO | 2.1 | 8.6 | 8.8 |
| PLSt | 3.2 | 1.7 | 1.9 |
| PLO | 0.3 | 1.5 | 1.8 |
| StStSt | 0.4 | 4.6 | 4.9 |
| StOSt | 28.6 | 15 | 13.7 |
| StOO | 2.8 | 10.1 | 10.4 |
| StLSt | 1.7 | 0.9 | 1 |
| OOO | 0.1 | 2.8 | 3.1 |
| OLO | 0.1 | 0.6 | 0.7 |
| StLO | 0.3 | 1.5 | 1.9 |
| C16:0 | 25.5 | 25.8 | 25.9 |
| C18:0 | 36.4 | 36.3 | 36.1 |
| C18:1 | 33 | 33 | 32.8 |
| C18:2 | 2.8 | 2.8 | 3.4 |
| TAG | * | 65.6 | * |
| DAG | * | 30.9 | * |
| MAG | * | 2.6 | * |

The results show that without removing free fatty acids from cocoa butter, a similar randomly interesterified fat product can be obtained by the process according to this invention. Moreover, mono- and diglycerides are also generated from this process where the content of monoglyceride in the fat product is 2.6% by weight. The generated mono- and diglycerides provide the randomly interesterified fat product with additional emulsifying properties. The degree of randomization of Fat product 9 can be calculated based on the triglyceride that was decreasing the most during the reaction (POSt in this example) by considering 100% randomization in the reference sample. Therefore, the degree of randomization is then (POSt (in cocoa butter)−POSt (in Fat product 9))/(POSt (in cocoa butter)−POSt (in Reference 3))×100%, which is 92.2%.

Example 10

480 g crude shea olein and 320 g crude shea butter with 12 g glycerol and 12 g propylene glycol (3% by weight of polyol compounds based on total fat composition) was prepared in a glass vessel and mixed with nitrogen gas from the bottom at 700. The weight ratio of free fatty acid in the fat composition to polyol compounds (glycerol and propylene glycol) is thus 5.0 calculated as 15/3. The reaction was catalyzed by immobilized lipase originating from *Candida antarctica* B immobilized on macroporous acrylic resin (Novozym® 435). When the reaction was completed, after approximatively 24 hours, the product was filtered. The analytical results of the crude shea olein/shea stearin blend and the product obtained by the inventive process are shown in table 13.

TABLE 13

Fat composition—crude shea olein/crude shea butter blend and enzymatically interesterified crude shea olein/crude shea butter blend according to the invention.

| | Crude shea olein/crude shea butter = 60/40 (w/w) | Fat product 10 |
|---|---|---|
| FFA as oleic acid | 15 | 0.14 |
| PStSt | 0.2 | 1.9 |
| POSt | 3.7 | 4.7 |
| StStSt | 1.1 | 5.2 |
| StOSt | 23.5 | 22.5 |
| StOO | 39.9 | 28.5 |
| StLSt | 3.1 | 2.1 |
| OOO | 7.7 | 12.2 |
| StLO | 6.8 | 7.8 |
| OLO | 1.8 | 4.8 |
| StLL | 1.2 | 0.7 |
| C16:0 | 3.9 | 3.8 |
| C18:0 | 37.2 | 36.8 |
| C18:1 | 49.0 | 49.4 |
| C18:2 | 7.4 | 7.3 |
| US-N10 | 21 | 25 |
| US-N15 | 12 | 18 |
| US-N20 | 7 | 14 |
| US-N25 | 6 | 10 |
| US-N30 | 5 | 7 |
| US-N35 | 2 | 6 |
| US-N40 | 1 | 2 |

The results show that the randomly interesterified fat product can be produced according to the invention by using different polyol compounds.

Example 11

The initial crystallization curves at 20° C. of Fat product 1 and Reference 1 (Creamelt® Stand) were measured up to 40 minutes by means of pulsed NMR according to ISO 8292-1. Both curves are shown in FIG. 1. The results show that Fat product 1 has a faster initial crystallization speed and forms more initial solids which are particularly desirable in various applications, such as creams, spreads, fillings, margarines and shortenings.

The invention claimed is:

1. A method of preparing an edible randomly interesterified fat product comprising the steps of:
   a) providing a fat composition comprising from 0.5% to 25% by weight of free fatty acids measured according to AOCS Ca 5a-40, and calculated as a percentage of oleic acid; and
   b) reacting enzymatically the fat composition provided in step a) with 0.5% to 10% by weight of a polyol composition based on the weight of the fat composition, wherein the weight ratio of free fatty acid in the fat composition to the polyol composition is from 0.1 to 20.0;
   wherein the obtained randomly interesterified fat product has less than 1.0% by weight of free fatty acids measured according to AOCS Ca 5a-40 and calculated as a percentage of oleic acid.

2. The method according to claim 1, wherein the weight ratio of free fatty acid in the fat composition in step a) to the polyol composition in step b) is from 0.2 to 18.0.

3. The method according to claim 1, wherein in step a) the fat composition comprises from 0.5% to 20% by weight of free fatty acids measured according to AOCS Ca 5a-40, and calculated as a percentage of oleic acid.

4. The method according to claim 1, wherein in step a) the fat composition is selected from shea butter, cocoa butter, sal butter, mango kernel oil, illipe butter, kokum butter, mowrah butter, high stearic high oleic sunflower oil, fractions thereof and mixtures thereof.

5. The method according to claim 1, wherein in step a) the fat composition comprises at least 15% by weight of stearic acid (C18:0); said percentage of acid referring to acids bound as acyl groups in glycerides and any free fatty acids present in the fat composition and being based on the total weight of C8 to C24 fatty acids.

6. The method according to claim 1, wherein in step a) the fat composition comprises at least 1% by weight of unsaponifiables.

7. The method according to claim 1, wherein in step b) the provided fat composition is reacted with from 0.5% to 8% by weight of the polyol composition based on the weight of the provided fat composition.

8. The method according to claim 1, wherein in step b) the polyol composition is selected from glycerol, propylene glycol, polyglycerol and mixtures thereof.

9. The method according to claim 1, wherein in step b) the reaction is catalyzed by a lipase, where the lipase is from *Rhizomucor miehei*, *Candida antarctica*, *Thermomyces lanuginosus* or *Rhizopus oryzae*.

10. The method according to claim 1, wherein the obtained randomly interesterified fat product has less than 0.80% by weight of free fatty acids measured according to AOCS Ca 5a-40 and calculated as a percentage oleic acid, from 0.01% to 0.50% by weight.

11. The method according to claim 1, wherein the obtained randomly interesterified fat product has a degree of randomization of at least 70%.

12. The method according to claim 1, wherein the obtained randomly interesterified fat product comprises from 0.01% to 5% by weight of monoglycerides.

13. The method according to claim 1, wherein the obtained randomly interesterified fat product comprises from 1% to 35% by weight of diglycerides.

14. The method according to claim 1, wherein the obtained randomly interesterified fat product has a weight ratio of stearic add (C18:0) to oleic acid (C18:1) of from 0.3:1 to 3:1.

15. The method according to claim 1, wherein the obtained randomly interesterified fat product comprises at least 1% by weight of StStSt (tristearin triglyceride).

* * * * *